United States Patent
Fukuta

(10) Patent No.: US 10,005,423 B2
(45) Date of Patent: Jun. 26, 2018

(54) WEBBING RETRACTOR DEVICE

(71) Applicant: KABUSHIKI KAISHA TOKAI-RIKA-DENKI-SEISAKUSHO, Aichi-ken (JP)

(72) Inventor: Kenji Fukuta, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 179 days.

(21) Appl. No.: 15/163,238

(22) Filed: May 24, 2016

(65) Prior Publication Data

US 2016/0347274 A1    Dec. 1, 2016

(30) Foreign Application Priority Data

May 29, 2015 (JP) ................. 2015-110123

(51) Int. Cl.
*B60R 22/34* (2006.01)
*B60R 22/38* (2006.01)
*B60R 22/405* (2006.01)

(52) U.S. Cl.
CPC .......... *B60R 22/34* (2013.01); *B60R 22/3413* (2013.01); *B60R 22/38* (2013.01); *B60R 22/405* (2013.01)

(58) Field of Classification Search
CPC ....... B60R 22/34; B60R 22/38; B60R 22/405; B60R 22/3413
See application file for complete search history.

(56) References Cited

U.S. PATENT DOCUMENTS 6,352,213 B1 * 3/2002 Sumiyashiki ......... B60R 22/405
                                                    242/383.2
9,150,192 B2 * 10/2015 Yanagawa ........... B60R 22/3413

FOREIGN PATENT DOCUMENTS

CN        102689619 A    9/2012
DE    102010025234 A   12/2011
JP       2004262263 A    9/2004

OTHER PUBLICATIONS

Office Action issued in the corresponding Japanese patent application No. 2015-110123 dated Dec. 12, 2017.
Office Action issued in the corresponding Chinese patent application No. 201610320438.7 dated Dec. 26, 2017.

* cited by examiner

*Primary Examiner* — Sang K Kim
(74) *Attorney, Agent, or Firm* — Roberts Mlotkowski Safran Cole & Calderon P.C.

(57) ABSTRACT

In a webbing retractor device, a compression coil spring is suspended between an engagement frame of a V-gear and an engagement surface of a locking base. As a result of the engagement frame being engaged with from an exposed portion side by the compression coil spring that is being held in a holding groove of the locking base so as to be exposed to the exposed portion side, the compression coil spring is suspended between the V-gear and the locking base. Because of this, the compression coil spring can be easily suspended between the V-gear and the locking base.

11 Claims, 4 Drawing Sheets

WEBBING RETRACTOR DEVICE

CROSS-REFERENCE TO RELATED APPLICATION

This application is based on and claims priority under 35 USC 119 from Japanese Patent Application No. 2015-110123 filed on May 29, 2015, the disclosure of which is incorporated by reference herein.

BACKGROUND

Technical Field

The present disclosure relates to a webbing retractor device in which a webbing that is worn by a vehicle occupant is wound onto a take-up shaft.

Related Art

In a self-locking belt retractor described in German Patent Application Laid-Open No. 102010025234, a control disk is rotatably mounted at a belt shaft, and a spring is suspended between the belt shaft and the control disk.

Here, in this self-locking belt retractor, prior to the control disk being mounted at the belt shaft, the spring is suspended between a pair of pins that are provided atd at the control disk. Then, when the control disk is being mounted at the belt shaft, one pin is assembled with the belt shaft and is separated from the control disk, and the spring is then suspended between the belt shaft and the control disk.

SUMMARY

In consideration of the above-described circumstances, it is an object of the present invention to provide a webbing retractor device in which an urging component can be easily suspended between a take-up shaft and a rotating body.

The webbing retractor device according to a first aspect of the present invention is provided with a take-up shaft onto which a webbing that is worn by a vehicle occupant is wound, and that is rotated in a pull-out direction as a result of the webbing being pulled out, a rotating body that is rotatably mounted at the take-up shaft, an urging component that, as a result of being suspended between the take-up shaft and the rotating body, urges the rotating body in the pull-out direction relative to the take-up shaft so that the rotating body is able to rotate in conjunction with the rotation of the take-up shaft, and at which, as a result of the take-up shaft being rotated in the pull-out direction relative to the rotating body in resistance to the urging force, the rotation of the take-up shaft in the pull-out direction is limited, a holding portion that is provided at one of the take-up shaft or the rotating body, and that, prior to the rotating body being mounted at the take-up shaft, is able to hold the urging component such that it is exposed to an outer side in a longitudinal direction, and an engagement portion that is provided at the other one of the take-up shaft or the rotating body, and that, as a result of being engaged with from the outer side in the longitudinal direction by the urging component that is being held at the holding portion, enables the urging component to be suspended between the take-up shaft and the rotating body.

In the webbing retractor device according to the first aspect of the present invention, the webbing that is worn by the vehicle occupant is wound onto the take-up shaft, and when the webbing is pulled out, the take-up shaft is rotated in the pull-out direction. In addition, the rotating body is rotatably mounted at the take-up shaft, and the urging component is suspended between the take-up shaft and the rotating body. As a result, the urging component urges the rotating body in the pull-out direction relative to the take-up shaft, and the rotating body is able to rotate in conjunction with the rotation of the take-up shaft. Moreover, as a result of the take-up shaft being rotated in the pull-out direction relative to the rotating body while resisting the urging force from the urging component, the rotation of the take-up shaft in the pull-out direction is limited.

Here, the holding portion is provided at the one of the take-up shaft or the rotating body, and the engagement portion is provided at the other one of the take-up shaft or the rotating body. Furthermore, prior to the rotating body being mounted at the take-up shaft, the holding portion is able to hold the urging component such that the urging component is exposed to the outer side in a longitudinal direction. As a result of the engagement portion being engaged with from the outer side in the longitudinal direction by the urging component that is being held at the holding portion, the urging component is suspended between the take-up shaft and the rotating body.

Because of this, the engagement portion can be easily engaged with from the outer side in the longitudinal direction by the urging component that is being held at the holding portion, and the urging component can be easily suspended between the take-up shaft and the rotating body.

A webbing retractor device according to a second aspect of the present invention is characterized in that, in the webbing device according to the first aspect of the present invention, the holding portion is able to hold the urging component in a state of natural length in the longitudinal direction.

In the webbing retractor device according to the second aspect of the present invention, the holding portion is able to hold the urging component in a state of natural length in the longitudinal direction. Because of this, the urging component can be easily held at the holding portion.

A webbing retractor device according to a third aspect of the present invention is characterized in that, in the webbing device according to the first aspect of the present invention, the holding portion is able to hold the urging component in a compressed state in the longitudinal direction.

In the webbing retractor device according to the third aspect of the present invention, the holding portion is able to hold the urging component in a compressed state in the longitudinal direction. Because of this, the force with which the urging component is held by the holding portion can be increased.

A webbing retractor device according to a fourth aspect of the present invention is characterized in that, in the webbing device according to any one of the first through third aspects of the present invention, the urging component is inserted into the holding portion, and an inclined slope is provided inside the holding portion such that the urging component is exposed on the outer side in the longitudinal direction.

In the webbing retractor device according to the fourth aspect of the present invention, the urging component is inserted into the holding portion, and the inclined slope is provided inside the holding portion such that the urging component is exposed on the outer side in the longitudinal direction. Because of this, the urging component can be exposed on the outer side in the longitudinal direction by means of a simple structure.

A webbing retractor device according to a fifth aspect of the present invention is characterized in that, in the webbing device according to any one of the first through fourth aspects of the present invention, the holding portion is able to hold the urging component in a curved state in the longitudinal direction.

In the webbing retractor device according to the fifth aspect of the present invention, the holding portion is able to hold the urging component in a curved state in the longitudinal direction. Because of this, the urging component can be easily held at the holding portion.

A webbing retractor device according to a sixth aspect of the present invention is characterized in that, in the webbing device according to any one of the first through fifth aspects of the present invention, when the holding portion is provided at the take-up shaft, the holding portion exposes the urging component on the pull-out direction side, and when the holding portion is provided at the rotating body, the holding portion exposes the urging component on the opposite side from the pull-out direction.

In the webbing tractor device according to the sixth aspect of the present invention, when the holding portion is provided at the take-up shaft, the holding portion exposes the urging component on the pull-out direction side, and when the holding portion is provided at the rotating body, the holding portion exposes the urging component on the opposite side from the pull-out direction. Because of this, the engagement portion can be easily engaged with from the outer side in the longitudinal direction by the urging component that is being held at the holding portion.

BRIEF DESCRIPTION OF THE DRAWINGS

Exemplary embodiments of the present disclosure will be described in detail based on the following figures, wherein.

DETAILED DESCRIPTION

Figure 1:
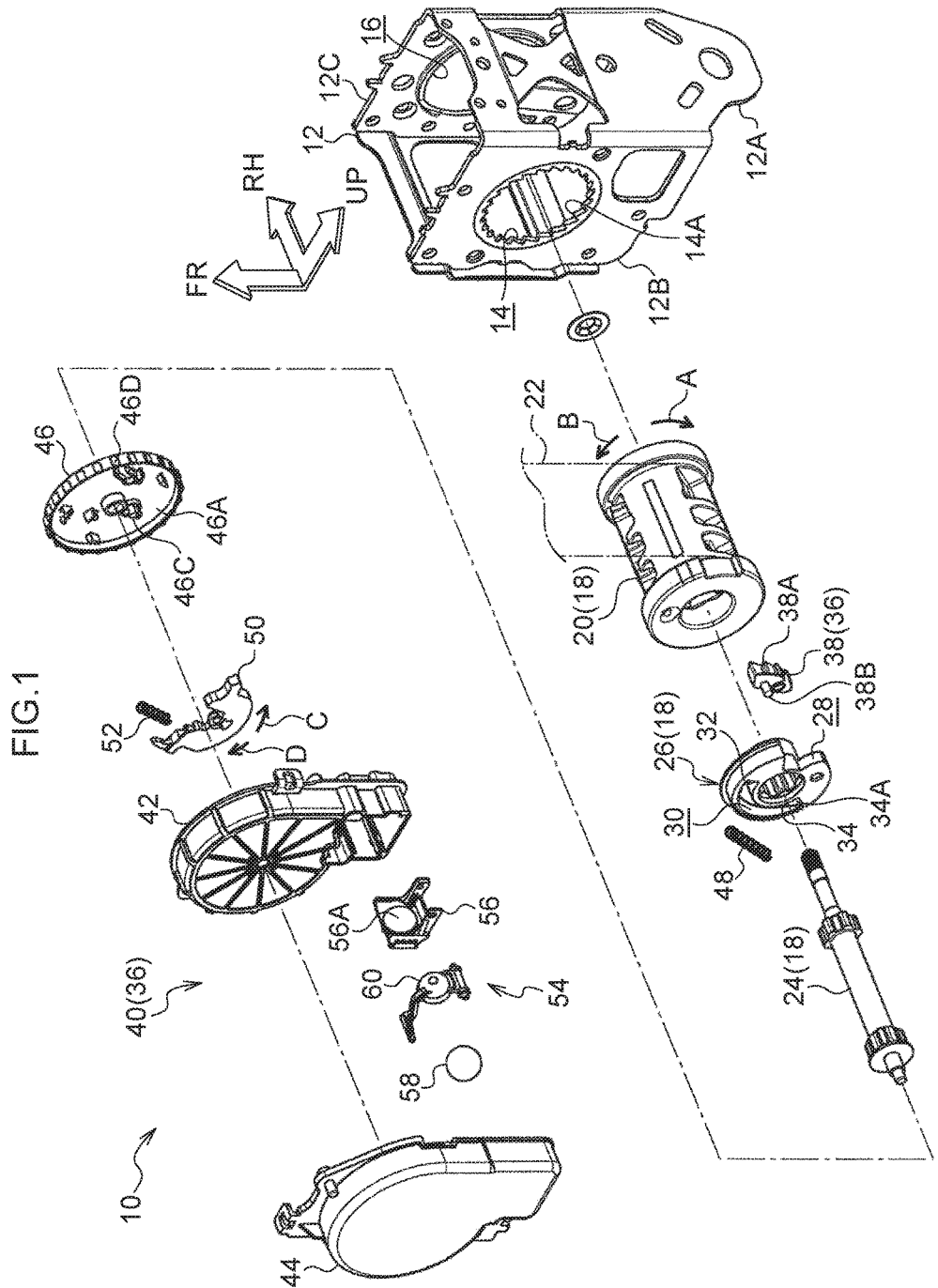
FIG. 1 is an exploded perspective view as seen from a diagonal direction on the front, left and upward sides showing a webbing retractor device according to an embodiment of the present invention.

A webbing retractor device 10 according to an embodiment of the present invention is shown in FIG. 1 in an exploded perspective view as seen from a diagonal direction on the front, left and upward sides. Note that in the drawings, a front side of the webbing retractor device 10 (for example, the front side of a vehicle) is shown by an arrow FR, while a right side of the webbing retractor device 10 (for example, the right side of the vehicle) is shown by an arrow RH, and an upward direction is shown by an arrow UP.

As is shown in FIG. 1, the webbing retractor device 10 according to the present embodiment is provided with a plate-shaped frame 12 having a U-shaped cross-section. A back plate 12A is provided at a top side of the frame 12. The webbing retractor device 10 is installed on a vehicle body by fixing the frame 12 to the vehicle body via this back plate 12A. A foot plate 12B and a foot plate 12C are provided respectively at the left side and the right side of the frame 12, and the foot plate 12B and the foot plate 12C face towards each other in the left-right direction.

Substantially circular placement holes 14 and 16 are formed penetrating the foot plate 12B and the foot plate 12C respectively. The placement hole 14 and the placement hole 16 face towards each other in the left-right direction. Moreover, ratchet teeth 14A (i.e., internal teeth) are formed around the entire outer circumference of the placement hole 14.

A substantially circular column-shaped take-up shaft 18 is provided between the foot portion 12B and the foot portion 12C of the frame 12. One end of the take-up shaft 18 that is located at the foot portion 12B side is placed inside the placement hole 14 in the foot plate 12B, while the other end of the take-up shaft 18 that is located at the foot portion 12C side is placed inside the placement hole 16 in the foot plate 12C. An axial direction of the take-up shaft 18 is aligned in parallel with the left-right direction, and the take-up shaft 18 is able to rotate in a circumferential direction.

A substantially circular cylinder-shaped spool 20 is provided as a take-up component at portions of the take-up shaft 18 other than the one end thereof. A long, belt-shaped webbing 22 (i.e., a belt) is wound from a base end side around the spool 20. When the spool 20 is rotated in a take-up direction (i.e. in one circumferential direction that is shown by an arrow A in FIG. 1 and the like), the webbing 22 is wound onto the spool 20. In contrast, when the webbing 22 is pulled out from the spool 20, the spool 20 is rotated in a pull-out direction (i.e. in another circumferential direction that is shown by an arrow B in FIG. 1 and the like). The webbing 22 extends on the forward side from the frame 12, and the webbing 22 is able to be worn by a vehicle occupant who is seated in a seat of the vehicle.

A long, substantially circular column-shaped torsion shaft 24 is inserted coaxially inside the spool 20 as a connecting component. One end portion of the torsion shaft 24 that is located at the foot portion 12B side extends on the foot portion 12B side of the spool 20. Another end portion of the torsion shaft 24 that is located at the foot portion 12C side is joined with the other end of the spool 20 so as to be able to rotate integrally therewith, and the torsion shaft 24 is thereby able to rotate integrally with the spool 20.

A substantially circular plate-shaped locking base 26 is provided as a restricting component at the one end of the take-up shaft 18, and the one end portion of the torsion shaft 24 is inserted coaxially through the locking base 26. The locking base 26 is joined to the torsion shaft 24 such that it is able to rotate integrally therewith, and the locking base 26 is able to rotate integrally with the torsion shaft 24 and the spool 20.

A housing hole 28 is formed as a housing portion in the locking base 26, and a portion of the housing hole 28 that is located at the outer side in the radial direction of the locking base 26 is cut open on the opposite side from the spool 20 and on the outer side in the radial direction of the locking base 26.

Figure 2:
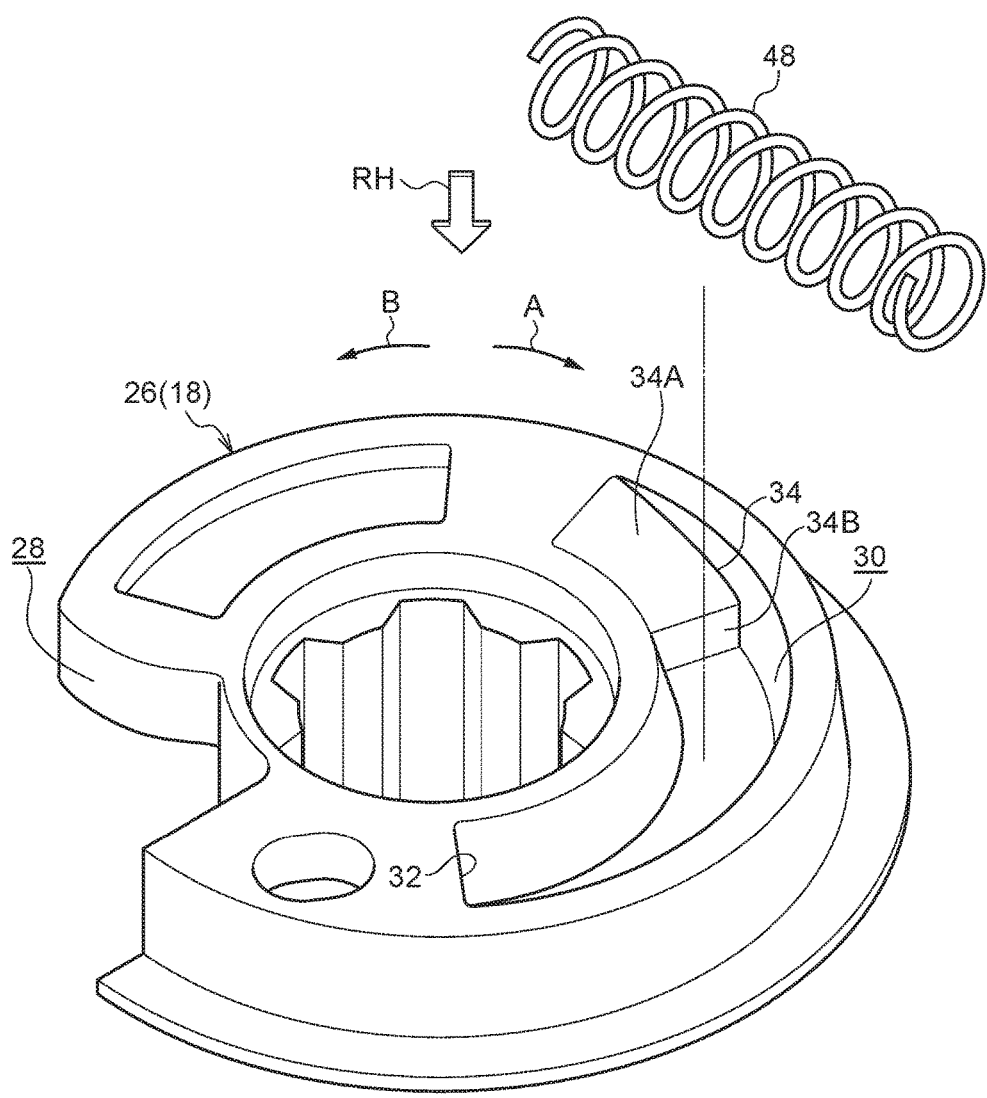
FIG. 2 is an exploded perspective view as seen from the left side showing principal portions of the webbing retractor device according to the embodiment of the present invention.

A holding groove 30 (see FIG. 2) having a rectangular cross-section is formed as a holding portion in the locking base 26. The holding groove 30 extends in the circumferential direction of the locking base 26, and opens up on the opposite side from the spool 20. A surface of the holding groove 30 that is located at the take-up direction side is formed as a planar locking surface 32. The locking surface 32 is perpendicular to the circumferential direction of the locking base 26. A substantially trapezoidal column-shaped exposed portion 34 is provided at an end portion of the holding groove 30 that is located at the pull-out direction side. The exposed portion 34 is formed integrally with the surfaces of the holding groove 30 that are located at the spool 20 side, on the two sides in the radial direction of the locking base 26, and on the pull-out direction side. The surface of the exposed portion 34 that is located at the opposite side from the spool 20 is formed as a planar inclined surface 34A, and the inclined surface 34A slopes in the direction of the spool 20 as it moves in the take-up direction. The surface of the exposed portion 34 that is located at the take-up direction side is formed as a planar step surface 34B, and the step surface 34B is perpendicular to the circumferential direction of the locking base 26.

An urging mechanism (not shown) is joined as a take-up urging device to the other end of the spool 20. The urging mechanism is located at the outer side of the foot plate 12C of the frame 12. The urging mechanism urges the spool 20 in the take-up direction so that, as a result, urging force is applied to the webbing 22 in the direction at which it is wound onto the spool 20.

A locking mechanism 36 is provided as a limiting device at the locking base 26 side of the spool 20.

An elongated plate-shaped locking pawl 38 is provided as a moving component at the locking mechanism 36. The locking pawl 38 is housed such that it is able to move inside the housing hole 28 in the locking base 26. Locking teeth 38A are formed on one end of the locking pawl 38, and the locking teeth 38A are exposed on the outer side in the radial direction of the locking base 26. A circular column-shaped moving shaft 38B is provided as a moving portion integrally with the locking pawl 38, and the moving shaft 38B protrudes from the locking base 26 on the opposite side from the spool 20.

A sensor mechanism 40 is provided as a detection device at the locking mechanism 36. The sensor mechanism 40 is located at the outer side of the foot plate 12B of the frame 12.

A substantially circular cylinder-shaped sensor holder 42 having a bottom plate at one end thereof is provided at the sensor mechanism 40. The interior of the sensor holder 42 is open on the foot plate 12B side, and the sensor holder 42 is fixed to the foot plate 12B. A substantially circular cylinder-shaped sensor cover 44 having a bottom plate at one end thereof is provided at the opposite side of the sensor holder 42 from the foot plate 12B. The interior of the sensor cover 44 is open on the foot plate 12B side and, in addition to being fixed to the foot plate 12B, also houses the sensor holder 42.

A circular cylinder-shaped V-gear 46 having a bottom plate at one end thereof is provided as a rotating body inside the sensor holder 42. The interior of the V-gear 46 is open to the bottom wall side of the sensor holder 42. The V-gear 46 is supported at a bottom wall 46A thereof by the one end portion of the torsion shaft 24 so as to be coaxial with the torsion shaft 24 and so as to also be able to rotate. The V-gear 46 is located at the opposite side of the locking base 26 from the spool 20.

Figure 3:
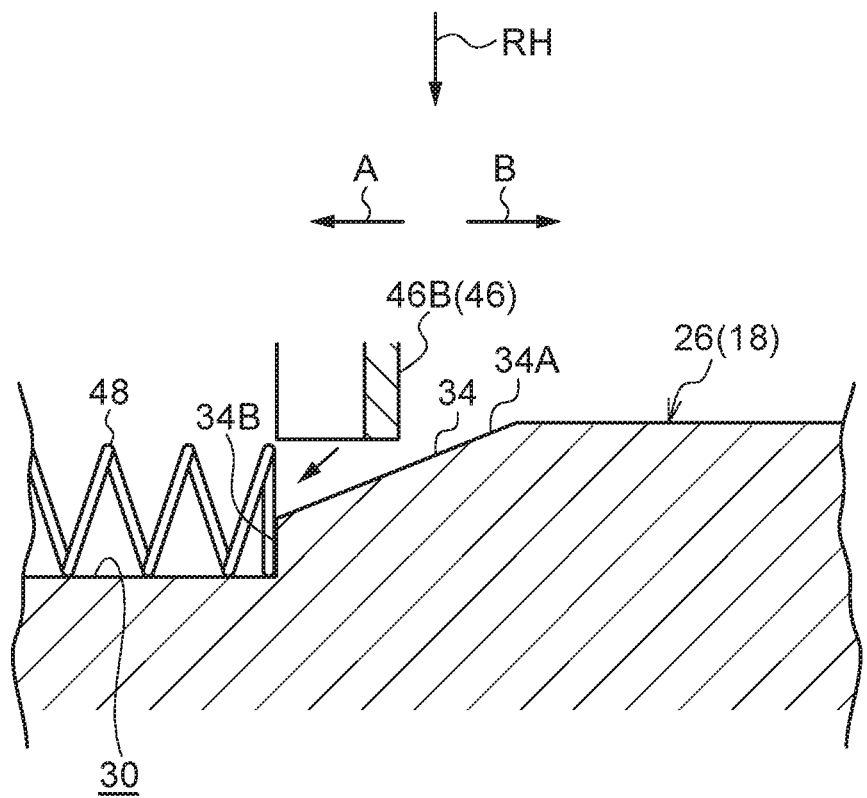
FIG. 3 is a cross-sectional view showing principal portions of the webbing retractor device according to the embodiment of the present invention.

An elongated operating groove (not shown) is formed as an operating portion in the bottom wall 46A of the V-gear 46. This operating groove is open on the locking base 26 side, and the moving shaft 38B of the locking pawl 38 is movably inserted inside this operating groove. A plate-shaped engagement frame 46B (see FIG. 3) having a substantially U-shaped cross-section is provided as an engagement portion integrally with the bottom wall 46A of the V-gear 46. The engagement frame 46B protrudes onto the locking base 26 side, and the interior thereof is open on the locking base 26 side and on the take-up direction side.

A compression coil spring 48 is suspended as an urging component between the engagement frame 46B (i.e., the interior of the engagement frame 46B) of the V-gear 46 and the locking surface 32 of the locking base 26 (i.e., the holding groove 30). The compression coil spring 48 is bent in a radial direction, and a longitudinal direction (i.e., an axial direction) thereof is curved in the circumferential direction of the locking base 26 and the V-gear 46. The compression coil spring 48 is housed in the holding groove 30. The compression coil spring 48 undergoes compressive deformation in the longitudinal direction thereof, and urges the V-gear 46 in the pull-out direction relative to the locking base 26 (i.e., urges the locking base 26 in the take-up direction relative to the V-gear 46). The compression coil spring 48 uses urging force to push the moving shaft 38B of the locking pawl 38 against one end in the longitudinal direction of the operating groove of the V-gear 46. By doing this, the rotation of the V-gear 46 in the pull-out direction relative to the locking base 26 that is brought about by the urging force of the compression coil spring 48 is locked, and the V-gear 48 is thereafter able to rotate in conjunction with the rotation of the locking base 26.

Before the V-gear 46 is mounted at (i.e., is supported by) the one end portion of the torsion shaft 24, the compression coil spring 48 is curved in its longitudinal direction and the dimension thereof in the longitudinal direction is the length when the compression coil spring 48 is neither extended or compressed but is in a state of natural length. In this state, the compression coil spring 48 is housed between the locking surface 32 and the exposed portion 34 of the holding groove 30 in the locking base 26. As a result, the compression coil spring 48 can be held in the holding groove 30 by the urging force of the compression coil spring 48 (i.e., elastic restoring force in a radial direction) while being exposed on the exposed portion 34 side (i.e., on the pull-out direction side, on the outer side in the longitudinal direction) (see FIG. 3).

A circular column-shaped swing shaft 46C is provided integrally with the bottom wall 46A of the V-gear 46. The swing shaft 46C is located at an offset position relative to the central axis of the V-gear 46, and protrudes towards the interior of the V-gear 46 in parallel with the central axis of the V-gear 46. Ratchet teeth 46D (i.e., external teeth) are formed around the entire outer circumference of the V-gear 46.

A W-pawl 50 is supported as a first operating component on the swing shaft 46C of the V-gear 46 such that it is able to swing (i.e., be displaced). A coil-shaped return spring 52 is suspended as a return-urging device between the W-pawl 50 and the V-gear 46. The return spring 52 urges the W-pawl 50 in the return direction (i.e., in the direction shown by an arrow C in FIG. 1). The swing in the return direction of the W-pawl 50 that is brought about by the urging force from the return spring 52 is locked by the V-gear 46. If the V-gear 46 is abruptly rotated in the pull-out direction, the W-pawl 50 is swung by inertia in the take-up direction relative to the V-gear 46 in the operating direction (i.e., in the direction shown by an arrow D in FIG. 1) relative to the V-gear 46 in resistance to the urging force of the return spring 52. As a result, the W-pawl 50 engages with the sensor holder 42, and the rotation of the V-gear 46 in the pull-out direction is locked.

An acceleration sensor 54 is provided at a rear end portion of the sensor holder 42. A plate-shaped housing 56 having an L-shaped cross-section is provided at the acceleration sensor 54, and the housing 56 is provided with a bottom wall and a side wall (i.e., a rear wall). A concave curved surface 56A is provided at a top surface of the bottom wall of the housing 56, and a spherical ball 58 is placed as a second operating component on top of the curved surface 56A. A substantially plate-shaped lever 60 is placed on top of the ball 58, and the lever 60 is supported at its base end such that it is able to pivot on the side wall of the housing 56. The V-gear 46 is placed on a top side of a distal end of the lever 60, and when the ball 58 is lifted up (i.e., is displaced) by rolling over the curved surface 56A of the housing 56, the lever 60 is pivoted upwards by the ball 58 and the distal end thereof meshes with the ratchet teeth 46D of the V-gear 46. As a result, the rotation of the V-gear 46 in the pull-out direction is locked.

Next, an operation of the present embodiment will be described.

In the webbing retractor device 10 having the above-described structure, the spool 20, the torsion shaft 24, and the locking base 26 of the take-up shaft 18 are able to rotate integrally with each other, and the V-gear 46 is able to rotate in conjunction with the rotation of the locking base 26.

Moreover, as a result of the webbing 22 being pulled back and the spool 20 being rotated in the pull-out direction while resisting the urging force of the urging mechanism, the webbing 22 is pulled out from the spool 20 and is put on by a vehicle occupant. Furthermore, when the vehicle occupant is wearing the webbing 22, take-up force to wind the webbing 22 back onto the spool 20 is applied to the webbing 22 by the urging force from the urging mechanism, so that any slackness in the webbing 22 is removed.

When the vehicle is in an emergency situation (for example, during a sudden deceleration), in the acceleration sensor 54 the ball 58 is forced by inertia to roll over the curved surface 56A of the housing 56 and be lifted upwards. As a result, the lever 60 is pivoted upwards by the ball 58, and the distal end thereof meshes with the ratchet teeth 46D of the V-gear 46. As a consequence, the rotation of the V-gear 46 in the pull-out direction is locked.

When the vehicle is in an emergency situation (for example, during a sudden deceleration), the vehicle occupant is moved by inertia, and the webbing 22 is abruptly pulled out from the spool 20 by the motion of the vehicle occupant. As a result, the spool 20 and the V-gear 46 are abruptly rotated in the pull-out direction. As a consequence, the W-pawl 50 is swung by the inertia acting in the take-up direction relative to the V-gear 46 in the operating direction relative to the V-gear 46 in resistance to the urging force of the return spring 52. As a result, the W-pawl 50 engages with the sensor holder 42, and the rotation of the V-gear 46 in the pull-out direction is locked.

As is described above, when the rotation of the V-gear 46 in the pull-out direction is locked, the spool 20 and the locking base 26 are rotated in the pull-out direction relative to the V-gear 46 in resistance to the urging force of the compression coil spring 48. As a result, the moving shaft 38B of the locking pawl 38 is moved to the other end side in the longitudinal direction of the operating groove of the V-gear 46, and the locking pawl 38 is moved to the outer side in the radial direction of the locking base 26. As a result, the locking teeth 38A of the locking pawl 38 mesh with the ratchet teeth 14A of the frame 12 (i.e., of the foot plate 12B) so that the rotation of the locking base 26 and the spool 20 in the pull-out direction is limited. As a consequence, the pulling out of the webbing 22 from the spool 20 is limited, and the vehicle occupant is restrained by the webbing 22.

The V-gear 46 is supported by one end portion of the torsion shaft 24, and the compression coil spring 48 is suspended between the engagement frame 46B of the bottom wall 46A of the V-gear 46 and the locking surface 32 of the holding groove 30 of the locking base 26.

Here, prior to the V-gear 46 being mounted at the one end portion of the torsion shaft 24, the compression coil spring 48 is housed between the locking surface 32 and the exposed portion 34 of the holding groove 30. As a result, the compression coil spring 48 can be held in the holding groove 30 in a state of exposure to the exposed portion 34 side. Because of this, as a result of the engagement frame 46B being engaged with from the exposed portion 34 side by the compression coil spring 48 that is being held in a state of exposure to the exposed portion 34 side of the holding groove 30, the compression coil spring 48 is suspended between the V-gear 46 (i.e., the engagement frame 46B) and the locking base 26 (i.e., the locking surface 32) (see FIG. 3).

Consequently, the engagement frame 46B can easily be engaged with from the exposed portion 34 side by the compression coil spring 48 that is being held in the holding groove 30, and the compression coil spring 48 can easily be suspended between the V-gear 46 and the locking base 26.

Furthermore, when the compression coil spring 48 is urging the V-gear 46 in the pull-out direction relative to the locking base 26, and the compression coil spring 48 is being held in the holding groove 30, the compression coil spring 48 is exposed on the pull-out direction side (i.e., on the exposed portion 34 side). Because of this, the engagement frame 46B can be engaged with from the pull-out direction side by the compression coil spring 48 that is being held in the holding groove 30, so that the engagement frame 46B can be engaged even more easily with the compression coil spring 48, and the compression coil spring 48 can be suspended even more easily between the V-gear 46 and the locking base 26.

Moreover, because the holding groove 30 extends in the circumferential direction of the locking base 26 and is curved in the longitudinal direction thereof, and because the compression coil spring 48 is curved in the longitudinal direction thereof and is housed in the holding groove 30 in this state, the compression coil spring 48 is able to be held in the holding groove 30 by the urging force of the compression coil spring 48 (i.e., by an elastic restoring force in a radial direction). Because of this, the compression coil spring 48 can be curved in the longitudinal direction thereof and housed in the holding groove 30 in this state, so that the compression coil spring 48 can be held in the holding groove 30, and the compression coil spring 48 can be easily held in the holding groove 30.

Furthermore, the compression coil spring 48 can be held between the locking surface 32 and the exposed portion 34 of the holding groove 30 with its longitudinal dimension in a state of natural length. Because of this, when the compression coil spring 48 is being installed in the holding groove 30, the need to compress the compression coil spring 48 in the longitudinal direction thereof can be eliminated, and the compression coil spring 48 can be held even more easily in the holding groove 30.

When the compression holding spring 48 is being held in the holding groove 30, the compression coil spring 48 is exposed on the exposed portion 34 side by the inclined surface 34A of the exposed portion 34. Because of this, the compression coil spring 48 can be exposed on the exposed portion 34 side by means of a simple structure.

Furthermore, the exposed portion 34 also reinforces the portion of the locking base 26 where the holding groove 30 is formed. Because of this, it is possible to increase the strength of the portion of the locking base 26 where the holding groove 30 is formed.

Moreover, the step surface 34B is provided at the exposed portion 34, and the dimensions of the exposed portion 34 in the axial direction of the locking base 26 are increased. Because of this, the exposed portion 34 is able to effectively reinforce the portion of the locking base 26 where the holding groove 30 is formed, and it is possible to effectively increase the strength of the portion of the locking base 26 where the holding groove 30 is formed.

Figure 4:
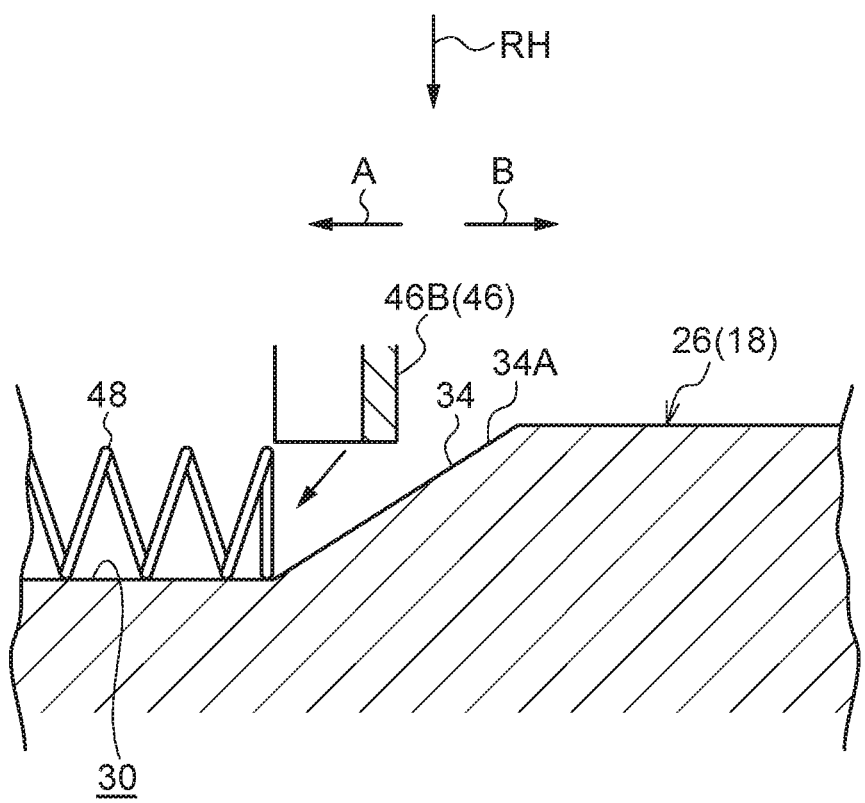
FIG. 4 is a cross-sectional view showing a variant example of the webbing retractor device according to the embodiment of the present invention.

Note that, in the present embodiment, the step surface 34B is provided at the exposed portion 34. However, as is shown in FIG. 4, it is also possible for the step surface 34B to not be provided at the exposed portion 34. By employing this structure, the compression coil spring 48 that is held in the holding groove 30 can be even more exposed on the exposed portion 34 side, and the engagement frame 46B can be even more easily engaged with from the exposed portion 34 side by the compression coil spring 48.

Note also that, in the present embodiment, the exposed portion 34 is provided at the holding groove 30. However, it is also possible for the exposed portion 34 to not be provided at the holding groove 30.

In the present embodiment, the compression coil spring 48 is able to be held between the locking surface 32 and the exposed portion 34 of the holding groove 30 with its longitudinal dimension in a state of natural length. However, it is also possible for the compression coil spring 48 to be held between the locking surface 32 and the exposed portion 34 of the holding groove 30 in a compressed state in its longitudinal direction. By doing this, the force holding the compression coil spring 48 between the locking surface 32 and the exposed portion 34 can be increased. In this case, it is also possible for the compression coil spring 48 to be held between the locking surface 32 and the exposed portion 34 without the compression coil spring 48 being curved in its longitudinal direction.

In the present embodiment, the holding groove 30 is provided at the locking base 26, and the engagement frame 46B is provided at the V-gear 46. However, it is also possible for the holding groove 30 to be provided at the V-gear 46, and for the engagement frame 46B to be provided at the locking base 26. In this case, when the compression coil spring 48 is being held at the V-gear 46, the compression coil spring 48 may be exposed on the take-up direction side.

In the present embodiment, the holding groove 30 is provided at the locking base 26, and the locking surface 32 and the exposed portion 34 are provided at the holding groove 30. However, it is also possible for the locking surface 32 and the exposed portion 34 to be provided protruding from the locking base 26 or the V-gear 46.

What is claimed is:

1. A webbing retractor device comprising:
  a take-up shaft onto which a webbing that is worn by a vehicle occupant is wound, and that is rotated in a pull-out direction as a result of the webbing being pulled out;
  a rotating body that is rotatably mounted at the take-up shaft;
  an urging component that, as a result of being suspended between the take-up shaft and the rotating body, urges the rotating body in the pull-out direction relative to the take-up shaft so that the rotating body is able to rotate in conjunction with the rotation of the take-up shaft, and at which, as a result of the take-up shaft being rotated in the pull-out direction relative to the rotating body in resistance to the urging force, the rotation of the take-up shaft in the pull-out direction is limited;
  a holding portion that is provided at one of the take-up shaft or the rotating body, and that, prior to the rotating body being mounted at the take-up shaft, is able to hold the urging component such that the urging component is exposed to an outer side in a longitudinal direction; and
  an engagement portion that is provided at the other one of the take-up shaft or the rotating body, and that, as a result of being engaged with a portion exposed to the outer side in the longitudinal direction of the urging component in a state in which the urging component is being held at the holding portion, enables the urging component to be suspended between the take-up shaft and the rotating body.

2. The webbing retractor device according to claim 1, wherein the holding portion is able to hold the urging component in a state of natural length in the longitudinal direction.

3. The webbing retractor device according to claim 1, wherein the holding portion is able to hold the urging component in a compressed state in the longitudinal direction.

4. The webbing retractor device according to claim 1, wherein the urging component is inserted into the holding portion, and an inclined slope is provided inside the holding portion such that the urging component is exposed on the outer side in the longitudinal direction.

5. The webbing retractor device according to claim 1, wherein the holding portion is able to hold the urging component in a curved state in the longitudinal direction.

6. The webbing retractor device according to claim 1, wherein, in a case in which the holding portion is provided at the take-up shaft, the holding portion exposes the urging component on the pull-out direction side, and in a case in which the holding portion is provided at the rotating body, the holding portion exposes the urging component on the opposite side from the pull-out direction.

7. The webbing retractor device according to claim 1, wherein the urging component is able to be held at the holding portion between a locking surface and an exposed portion, and the exposed portion exposes the urging component on the outer side in the longitudinal direction.

8. The webbing retractor device according to claim 7, wherein at least one of the locking surface or the exposed portion is provided in the holding portion.

9. The webbing retractor device according to claim 7, wherein at least one of the locking surface or the exposed portion is provided so as to protrude outwards.

10. The webbing retractor device according to claim 7, wherein a step surface is provided at a portion of the exposed portion that is located at the holding portion bottom surface side thereof.

11. The webbing retractor device according to claim 1, wherein the urging component is captured and held between a locking surface and an exposed portion of the holding portion before being engaged by the engagement portion.

* * * * *